Patented Sept. 4, 1934

1,972,443

UNITED STATES PATENT OFFICE

1,972,443

METHOD OF APPLYING SALT ON PISTACHIO NUTS

Deborah Halabi, Vladimir N. Halabi, and Steven Reggio, New York, N. Y.

No Drawing. Application August 6, 1929, Serial No. 383,973

5 Claims. (Cl. 99—11)

This invention relates to new and useful improvements in pistachio nuts and has more particular reference to a substance for and a method of applying the salt.

As may be readily understood, the sale of any food will materially be decreased if there is a bad effect after eating. The present method of coating pistachio nuts with the use of gum arabic (mucilage) and salt causes gas and flatulence to the delicate digestive systems of persons particularly children and adults with weak digestive powers. The nuts are habitually taken into the mouth to remove the shells and the saliva dissolves the coating on the nuts and shells, which coating upon being swallowed forms a mucilaginous and sticky mass in the stomach.

It is easily understood that should a child swallow a mixture of mucilage and salt it will cause cramps and subsequent indigestion. This is also true of persons with weak stomachs. Pistachio nuts before being salted are cracked open partially and the gum arabic solution enters this crack and deposits upon the nut. In addition, the salt upon the shell is very tasty and quite often persons allow the shells to remain in the mouth until a large quantity of the salt and gum arabic is removed and mixed with the saliva.

It is proposed to provide various substances capable of holding a coating of salt upon pistachio nuts and which at the same time are readily digestible or pass thru the system and will not cause indigestion. The invention further proposes the provision of substances of the class mentioned which are dependable in use and which can be manufactured and sold at a low cost so as to be capable of providing competition for gum arabic.

For further comprehension of the invention, and of the objects and advantages thereof, reference will be had to the following description and to the appended claims in which the various novel features of the invention are more particularly set forth.

The invention consists in the use of either dextrose, casein, maltose, calcium phosphate, or starch, and to enable others to make use of our invention we give the following as one of the most approved formulas for compounding and manufacturing the same. Place a quantity of unsalted pistachio nuts in cracked condition in any one of the above substances and then spray with a concentrated solution of salt or spray an aqueous solution of any of the above substances upon the nuts and then apply the salt. For 300 pounds of pistachio nuts it will be found that 4 pounds of dextrose, or ½ pound of casein, or 4 pounds of maltose, or 3 pounds of calcium phosphate, or 2 pounds of starch would be necessary. The spraying should be done during the roasting of the nuts.

It might be stated that the substances may be used with various different kinds of pistachio nuts without affecting their particular flavors. The quality of a pistachio nut, of course, depends upon its flavor. It will be found that the flavors of the various nuts such as Italian, the Syrian, the Persian, the Indian or the Californian will not be affected. The Syrian nuts usually are yellow, yellow and green, or green while the other nuts are green.

Maltose and casein may be easily digested and for this reason alone will not cause bad after effects. Calcium phosphate in a mixture with salt and citric acid will also give a mixture which will not interfere with digestion. Dextrose is an invert sugar, is not gummy like gum arabic, and may be directly absorbed from the stomach into the circulation.

While we have illustrated and described our invention with some degree of particularity, we realize that in practice various alterations may be made. We therefore reserve the right and privilege of changing the form of the details or otherwise altering the arrangement of the correlated parts without departing from the spirit or the scope of the appended claims.

Having thus described our invention, what we claim as new, and desire to secure by United States Letters Patent is:—

1. A method of treating pistachio nuts which consists of spraying them with a concentrated solution of salt and calcium phosphate with citric acid while the nuts are passing through the roaster.

2. A nut coating solution, including salt, citric acid and calcium phosphate.

3. A method of treating pistachio nuts while being roasted which consists of spraying them with a concentrated solution of salt containing also calcium phosphate and citric acid.

4. A method of treating pistachio nuts which consists in coating them with an adherent coating including salt, calcium phosphate and citric acid and applying at least a part of said coating by spraying a solution thereof on the nuts during roasting.

5. A compound for treating pistachio nuts consisting of a concentrated solution of salt, calcium phosphate and citric acid.

DEBORAH HALABI.
VLADIMIR N. HALABI.
STEVEN REGGIO.